United States Patent
Cox et al.

(10) Patent No.: US 6,911,411 B2
(45) Date of Patent: Jun. 28, 2005

(54) CATALYST AGGLOMERATES FOR MEMBRANE ELECTRODE ASSEMBLIES

(75) Inventors: Philip Cox, San Jose, CA (US); Suk-Yal Cha, Santa Clara, CA (US); Gouyan Hou, Menlo Park, CA (US); Ngan Tran, San Jose, CA (US); Anh Duong, San Francisco, CA (US)

(73) Assignee: Polyfuel, Inc., Mountain View, CA (US)

( * ) Notice: Subject to any disclaimer, the term of this patent is extended or adjusted under 35 U.S.C. 154(b) by 0 days.

(21) Appl. No.: 10/301,131

(22) Filed: Nov. 21, 2002

(65) Prior Publication Data

US 2003/0134739 A1 Jul. 17, 2003

Related U.S. Application Data

(60) Provisional application No. 60/332,436, filed on Nov. 21, 2001.

(51) Int. Cl.[7] .................................................. B01J 31/00
(52) U.S. Cl. ......................... 502/159; 429/40; 502/101; 29/623.1
(58) Field of Search ................................ 502/159, 101; 429/40; 29/623.1

(56) References Cited

U.S. PATENT DOCUMENTS

| | | | |
|---|---|---|---|
| 4,524,114 A | | 6/1985 | Samuels et al. |
| 5,561,000 A | * | 10/1996 | Dirven et al. ............ 429/42 |
| 5,707,763 A | * | 1/1998 | Shimizu et al. ........... 429/217 |
| 5,728,485 A | | 3/1998 | Watanabe et al. |
| 5,766,788 A | * | 6/1998 | Inoue et al. .............. 429/42 |
| 5,773,162 A | | 6/1998 | Surampudi et al. |
| 5,776,539 A | * | 7/1998 | Watanabe et al. ........ 427/113 |
| 5,869,132 A | * | 2/1999 | Watanabe et al. ........ 427/215 |
| 5,871,860 A | * | 2/1999 | Frost et al. .............. 429/40 |
| 5,910,378 A | * | 6/1999 | Debe et al. .............. 429/42 |
| 6,428,584 B1 | * | 8/2002 | Debe et al. ............. 29/623.1 |
| 6,465,136 B1 | | 10/2002 | Fenton et al. |
| 6,492,295 B2 | | 12/2002 | Hitomi et al. |
| 6,524,736 B1 | * | 2/2003 | Sompalli et al. .......... 429/42 |
| 2002/0119363 A1 | | 8/2002 | Uribe et al. |
| 2002/0192533 A1 | | 12/2002 | Gebhardt et al. |
| 2003/0031916 A1 | | 2/2003 | Haridoss et al. |

* cited by examiner

Primary Examiner—Paul Marcantoni
Assistant Examiner—Jennine Brown
(74) Attorney, Agent, or Firm—Richard F. Trecartin; Dorsey & Whitney LLP

(57) ABSTRACT

A method of preparing catalyst agglomerates for electrochemical devices is provided. The method comprises dispersing particles of a catalyst in a non-aqueous solvent to form a dispersion of the catalyst, adding an ion conducting polymer in a dilute solution to the dispersion of the catalyst under agitation to form catalyst agglomerates, and stirring the dispersion of the catalyst and the catalyst agglomerates to control the growth of the agglomerates. A directly applicable catalyst composition is also provided. The catalyst composition comprises the catalyst agglomerates prepared according to the present invention, a solvent to plasticize surfaces of the catalyst agglomerates and the membrane, and a non-aqueous carrier solvent.

27 Claims, 4 Drawing Sheets

AD21-56

AD21-55

AD21-48

AD21-56

CATALYST AGGLOMERATES FOR MEMBRANE ELECTRODE ASSEMBLIES

This application claims the benefit of Provisional Application No. 60/332,436, filed Nov. 21, 2001.

FIELD OF THE INVENTION

This invention relates generally to the field of electrochemical devices and particularly to fuel cells. More particularly, this invention relates to methods of preparing catalyst agglomerates for electrodes of polymer electrolyte membrane based fuel cells.

BACKGROUND OF THE INVENTION

Fuel cells have been projected as promising power sources for portable electronic devices, electric vehicles, and other applications due mainly to their non-polluting nature. Of various fuel cell systems, the polymer electrolyte methanol based fuel cell technology such as PEMFC and DMFC (direct membrane fuel cell) have attracted much interest thanks to their high power density and high energy conversion efficiency. The "heart" of a polymer electrolyte membrane based fuel cell is the so called "membrane-electrode assembly" (MEA), which comprises a thin, solid proton conducting polymer membrane having a pair of electrode (i.e. an anode and a cathode) layers with dispersed catalysts on the opposing surfaces of the membrane electrolyte.

The catalyst structure formed in the electrode layers is critical to the performance of the fuel cell and the effective utilization of the catalyst. A good catalyst structure must have good proton conductivity, electrical conductivity, and adequate access of reactant gases to the active sites in the structure as well as removal of the reaction byproducts. Prior art methods of manufacturing electrode catalysts include the colloidal method in which ultrasound is used to form catalyst colloids. While the reported colloidal method is useful, there is still a need in the industry to continue development of catalysts structure with controlled particle size and morphology to improve the performance of the fuel cells and utilization of the catalysts.

SUMMARY OF THE INVENTION

It is an object of the present invention to provide a method for controlling the particle size and morphology of the catalyst agglomerates for fuel cell applications. It is another object of the present invention to provide a catalyst composition that can be directly printed or deposited onto the surfaces of the membranes to obtain a catalyst layer with good adhesion and coating uniformity.

In accordance with the invention, there is provided a method of preparing catalyst agglomerates for MEA's used in electrochemical devices. The method comprises dispersing particles of a catalyst in a non-aqueous solvent to form a dispersion of the catalyst, adding an ion conducting polymer in a dilute solution to the dispersion of the catalyst under agitation to form catalyst agglomerates, and stirring the catalyst agglomerates and the dispersion of the catalyst to control the growth of the agglomerates.

In one embodiment, the particles of the catalyst are preferably dispersed in an attritor having a ratio of bead to slurry from about 30:70 to 70:30 by volume and a bead size from about 1 to 20 mm in diameter. In another embodiment, the particles of the catalyst are dispersed in a sonication bath using sonication. Preferably, the catalyst dispersion has a concentration of catalyst from about 2 to 25 percent by weight.

Preferably, the ion conducting polymer is added to the dispersion of the catalyst in an amount from about 5 to 25 percent by weight of the catalyst to form catalyst agglomerates. In the case where platinum ruthenium black or platinum black is used for the anode catalyst, the ion conducting polymer is preferably diluted in an aqueous solution to a concentration from about 0.5 to 5 percent by weight. In the case where platinum black is used for the cathode catalyst, the ion conducting polymer is preferably diluted in an alcoholic solution to a concentration from about 0.5 to 5 percent by weight.

The dispersion of the catalyst and the catalyst agglomerates formed are further stirred to control the growth of the agglomerates. Preferably the growth of the agglomerates is controlled in an attritor having a ratio of bead to slurry from about 30:70 to 70:30 by volume and a bead size from 1 to 20 mm in diameter. Alternatively, a sonication bath can be used to control the growth of the agglomerates.

In another aspect of the present invention, there is provided a catalyst composition directly applicable to the surfaces of the membrane. The catalyst composition comprises the catalyst agglomerates prepared according to the present invention, a solvent to plasticize surfaces of the catalyst agglomerates and the membrane, and a non-aqueous carrier solvent.

The solvent to plasticize the surfaces of the catalyst agglomerates and the membrane comprises alcohol, water and acetamides. The non-aqueous carrier solvent comprises ketones, aliphatic or aromatic hydrocarbons, and acetate.

Optionally, additives can be included in the catalyst composition to improve the viscosity, modify the surface tension, improve the adhesion, or modify the performance characteristics of the catalyst composition.

BRIEF DESCRIPTION OF THE DRAWINGS

The foregoing and other objects of the invention will be more clearly understood from the following description when read in conjunction with the accompanying drawings in which.

DESCRIPTION OF PREFERRED EMBODIMENTS

Figure 1:
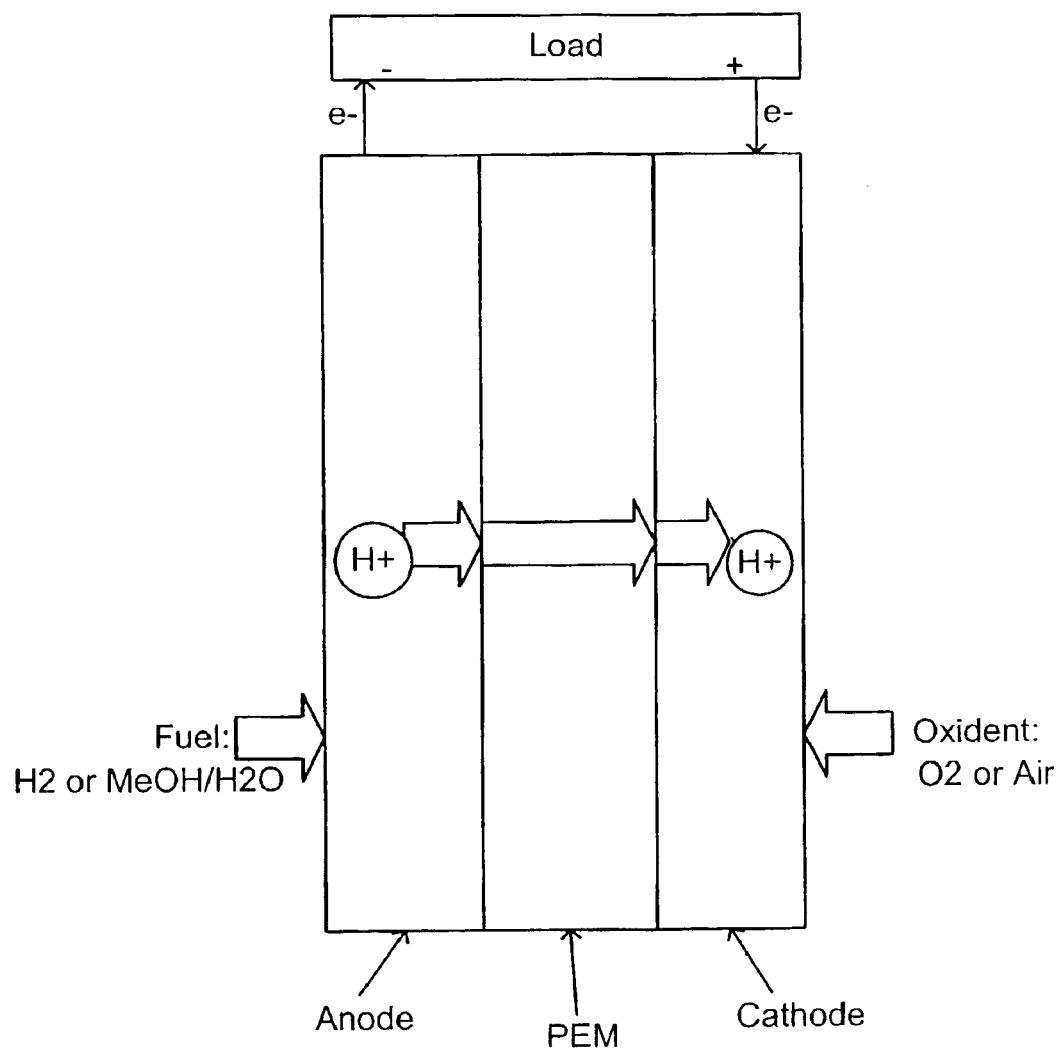
FIG. 1 schematically shows a fuel cell incorporating a membrane electrode assembly of the present invention.

FIG. 1 schematically shows a fuel cell incorporating the membrane-electrode assembly of the present invention. The membrane-electrode assembly comprises a solid polymer electrolyte membrane (PEM), an anode and a cathode which are supported on the opposing surfaces of the membrane. Each electrode comprises dispersed catalyst materials to form a catalyst layer in contact with each surface of the membrane.

At the anode, the hydrogen or methanol molecules react to form protons and electrons. In the case of methanol used as fuel, carbon dioxide is also formed. The electrons formed at the anode travel to the cathode through an external circuit, which produce electrical current to perform useful work by powering an electrical device. The protons migrate to the cathode through the membrane. At the cathode, oxygen molecules dissociate at the surface of the cathode catalyst to form dissociated oxygen atoms. The dissociated oxygen atoms formed at the cathode react with the protons and the electrons from the anode to form water.

For a polymer electrolyte membrane fuel cell (PEMFC) using hydrogen as the fuel and oxygen as the oxidant, the reactions at the anode and cathode of the membrane-electrode assembly are shown in equations below:

Anode: $2H_2 \rightarrow 4H^+ + 4e^-$ (I)

Cathode: $4e^- + 4H^+ + O_2 \rightarrow 2H_2O$ (II)

The hydrogen can be supplied in the form of substantially pure hydrogen or as a hydrogen-containing reformate, for example, the product of the reformation of methanol and water or the product of the reformation of natural gas or of other liquid fuels. Similarly, the oxygen can be provided as substantially pure oxygen or the oxygen can be supplied from air at ambient or elevated pressure.

For a direct methanol fuel cell (DMFC) using methanol as the fuel and oxygen as the oxidant, the reactions at the anode and cathode of the membrane-electrode assembly are shown in equations below:

Anode: $CH_3OH + 2H_2O \rightarrow CO_2 + 6H^+ + 6e^-$ (III)

Cathode: $6e^- + 6H^+ + {}^3/_2O_2 \rightarrow 3H_2O$ (IV)

The methanol can be supplied in the form of a dilute methanol solution having a concentration of 1 to 50 mol % methanol in water. The oxygen can be provided as substantially pure oxygen or the oxygen be supplied from air at ambient or elevated pressure.

Polymers suitable for the membrane are well known and can be any of the proton conductive polymers conventionally used in the prior art. Polymer membranes are described in U.S. patent application Ser. No. 09/872,770, the disclosure of which is hereby incorporated by reference. Examples of suitable polymer membranes include membranes comprising a first polymer having acidic subunits, a second polymer having basic subunits, and an elastomeric polymer having elastomeric subunits. Other polymers suitable for the membrane include perfluorinated sulfonic acid polymers such as Nafion® from the E. I. Dupont De Nemours and Company, as well as other membranes such as Gore Select® from the Gore Company.

Each electrode comprises catalytic materials to catalyze the electrochemical reactions occurring on the electrode. Noble metals are typically employed as the catalytic materials. Suitable noble metals include platinum, palladium, ruthenium, rhodium, osmium, iridium, and their alloys. Preferably platinum, or platinum alloys are used as catalytic material. Most preferably, the anode comprises platinum-ruthenium alloy, and the cathode comprises platinum.

Figure 2:
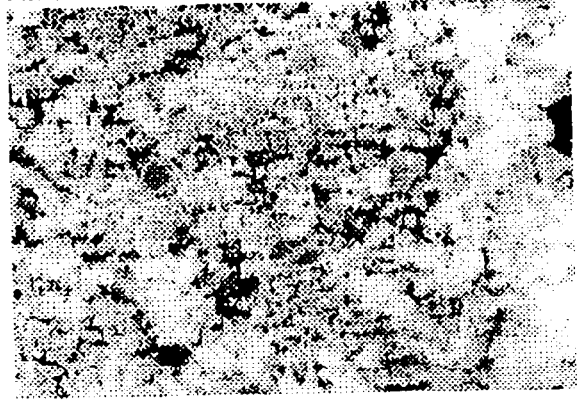
FIG. 2 is a SEM photo showing the morphology of the cathode catalyst prepared using an attritor of 60 cc size, 2 g batch and a bead to slurry ratio of 50:50 by volume. The ionomer used for preparing the catalyst agglomerates is Nafion®/isopropanol/water (1/0.5/0.5). The current density of the fuel cell comprising the cathode catalyst so prepared is 31.40 mA/mg at 0.6V.
Figure 3:
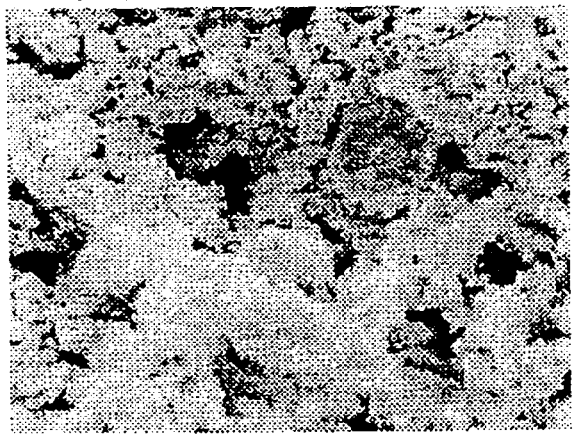
FIG. 3 is a SEM photo showing the morphology of the cathode catalyst prepared using an attritor of 60 cc size, 2 g batch and a bead to slurry ratio of 60:40 by volume. The ionomer used for preparing the catalyst agglomerates is Nafion®/isopropanol/water (1/0.5/0.5). The current density of the fuel cell comprising the cathode catalyst so prepared is 26.77 mA/mg at 0.6V.
Figure 4:
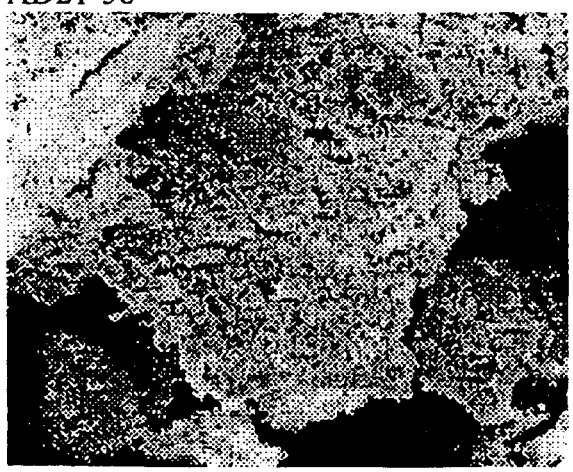
FIG. 4 is a SEM photo showing the morphology of the cathode catalyst prepared using an attritor of 60 cc size, 2 g batch and a bead to slurry ratio of 70:30 by volume. The ionomer used for preparing the catalyst agglomerates is Nafion®/isopropanol/water (1/0.5/0.5). The current density of the fuel cell comprising the cathode catalyst so prepared is 22.85 mA/mg at 0.6V.

In one embodiment of the present invention, each electrode layer comprises catalyst agglomerates prepared according to the present invention. FIGS. 2–4 are the SEM photos showing the structure of the cathode comprising the catalyst agglomerates prepared according to the present invention. These SEM photos show that the catalyst agglomerates have an even particle size, porosity distribution, and a uniform morphology. This allows the particles to be combined into an electrode layer to provide excellent packing, good surface coverage, even porosity distribution, and high level activity for hydrogen or methanol fuel at the anode and oxygen or air at the cathode.

In one embodiment of the present invention, there is provided a method for preparing the catalyst agglomerates that have a good catalyst morphology, pore structure and controlled particle size as shown in FIGS. 2–4. In accordance with the present method, particles of a catalyst are dispersed in a non-aqueous solvent to form a dispersion of the catalyst. An ion conducting polymer is added to the dispersion of the catalyst under agitation to form catalyst agglomerates. The catalyst agglomerates and the dispersion of the catalyst are stirred to control the growth of the catalyst agglomerates.

Attritors or similar ball mills can be used in the present invention to disperse the catalyst in a non-solvent, to form the catalyst agglomerates, and to control the growth of the catalyst agglomerates. Parameters of the attritor, including the bead size, the bead materials, the bead to slurry ratio, and the rotation speed and time all affect the particle size and the nature of the catalyst agglomerates. Preferably, the attritor has a bead to slurry ratio of from 30:70 to 70:30 by volume, more preferably 40:60 to 60:40, most preferably 50:50. The bead size can be in a range of from about 1 to 20 mm in diameter, preferably about 2 to 5 mm in diameter. The beads can be made of materials such as yttria stabilized zirconia, alumina, glass, and other ceramics. Preferably the beads are made of yttria stabilized zirconia. The attritor rotates at a speed of from about 50 to 500 rpm, or at an angular velocity from about 10 to 150 cm/s. The particles of the catalyst are dispersed in the non-solvent for a suitable period of time. The exact period of time can be determined according to the batch size of the attritor and the amount of catalyst to be dispersed in the non-solvent.

The non-solvent used for dispersing the catalyst in the attritor can be esters, acetates, aromatic or aliphatic hydrocarbons and ketones. Preferably the non-solvent is a hydrocarbon, ketone or an ester such as n-butyl acetate.

Preferred catalyst dispersion concentrations vary depending on the metal or alloy used. In the case of Pt/Ru catalyst, the dispersion concentration is preferably from 2 to 25 percent by weight, and more preferably from 5 to 20 percent by weight. In the case of Pt catalyst, the catalyst dispersion concentration is preferably from 2 to 25 percent by weight, and more preferably from 5 to 20 percent by weight.

In one embodiment of the present invention, sonication baths are used to disperse the catalyst particles in a non-solvent, to form the catalyst agglomerates, and to control the growth of the catalyst agglomerates.

The polymers used for forming the catalyst agglomerates are preferably proton conductive polymers. These proton conductive polymers can be the same polymers that make up the membrane electrolyte to promote reactant transport in the electrode structure, for example, to promote oxygen diffusion through the cathode or methanol diffusion in the anode. Alternatively, the proton conductive polymers can be a mixture of different ionomers to provide the best balance of properties, or can be different ionomers for each electrode or application. These proton conductive polymers must create a robust catalyst structure for catalyst retention, adhere well to the membrane-electrolyte, and enhance ion exchange capacity of the electrode. Suitable proton conductive polymers for forming catalyst agglomerates include those described in U.S. patent application Ser. No. 09/872, 770, the disclosure of which is hereby incorporated by reference. Examples of suitable proton conductive polymers include those that comprise a first polymer having acidic subunits, a second polymer having basic subunits, and an elastomeric polymer having elastomeric subunits. Other proton conductive polymers include perfluorinated sulfonic acid polymers such as Nafion® from the E. I. Dupont De Nemours and Company, as well as other membranes such as Gore Select® from the Gore Company.

The amount of the polymer solution added to the dispersion of the catalyst depends on the concentration of the polymer solution. Preferred polymer solution concentrations range from about 0.5 to 5, more preferably from about 1.5 to 3, and most preferably from about 1.5 to 2.5 percent by weight. It is preferred that the amount of polymer solution added provides a weight of polymer which is preferably from 5 to 25 percent of the catalyst, more preferably from 5 to 15 for the anode and 5 to 10 for the cathode, and most preferably from 6 to 15 percent for the anode and 7.5 to 15 percent for the cathode. The best addition amount of polymers depends on the polymers, the operating conditions of targeting application such as temperature, gas humidification level, and passive or active transport of reactants to the electrode surface. The addition of the polymer into the catalyst can be performed in the level of 33 to 100% of the polymer needed to make up the final catalyst layer, more preferably in the range of 75 to 95% of the final catalyst layer.

Figure 5:
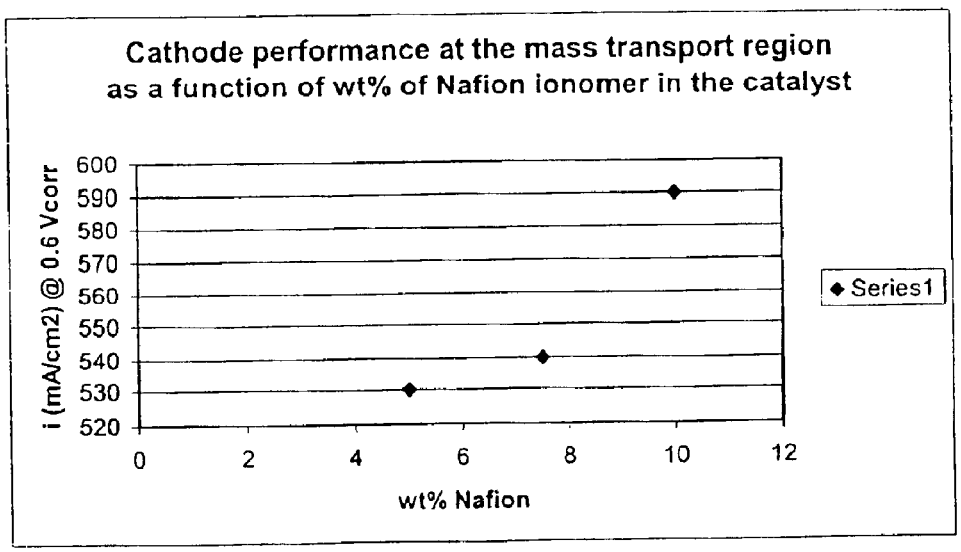
FIG. 5 is a graph showing the performance of the cathode comprising the present catalyst agglomerates at the mass transport region as a function of weight percentage of Nafion® ionomer in the catalyst.

FIG. 5 shows the cathode performance at the mass transport region as a function of weight percentage of Nafion® ionomer in the catalyst. The performance measured in a hydrogen/air fuel cell at 60° C. showed that a high Nafion® ionomer content in the cathode catalyst is preferred, both in the kinetic and in the mass transport region. The preferred Nafion® content is between 7 to 10 percent by weight. A higher amount of Nafion® ionomer appears to handle water removal better.

In addition to the proton conductive polymers, other materials can be incorporated to the catalyst agglomerates to impart additional performance characteristics for the fuel cells. For instance, silaneized fumed silica or Teflon® particles can be added to improve water removal from the cathode. These particle materials can be added during the formation of the catalyst agglomerates so that they are incorporated into the structure of the catalyst, or added at the end of the formation of the catalyst agglomerates to improve the characteristics on the outside surface of the agglomerates. Materials that enhance the uptake and transport of methanol into the anode structure can also be added into the structure of the catalyst agglomerates. The addition of fumed silica into the cathode catalyst improves the performance in the presence of high water contents.

The control of the addition rate of the polymer is important to the formation of the catalyst agglomerates with controlled particle size, porosity and morphology. Since the polymer usually contains a good solvent for both the polymer and the dispersion of the catalyst, the dispersed catalyst may transfer into the aqueous phase before significant agglomeration occurs if the polymer is added too quickly. This results in a poor distribution of the polymer and a low level of catalyst agglomeration. The polymer solution is preferably added using a peristaltic or similar pump to keep a constant addition rate. For instance, the polymer solution can be added at a rate of 0.5 to 1 ml per minute for the small 1 g batch size.

Preferably the polymer solution is diluted before being added to the dispersion of the catalyst. For instance, when platinum-ruthenium black or platinum black is used as the anode catalyst and dispersed in a non-solvent such as n-butyl acetate, the polymer solution is preferably diluted in an aqueous solution. The concentration of the polymer in the dilute aqueous solution can be from about 0.5 to 5% by weight. The water in the dilute aqueous polymer solution aids in wetting the hydrophilic platinum ruthenium surfaces and assists in forming the catalyst agglomerates. When platinum black is used as cathode catalyst and dispersed in a non-aqueous solvent, the polymer solution is preferably diluted in an alcoholic solution. The alcoholic solution can be a mixture of an alcohol and water in any ratio of alcohol to water from 0.01 to 100 by weight. Preferably, the alcoholic solution contains an alcohol and water in a ratio of about 1 by weight. The preferred alcohol used to dilute the polymer solution is isopropanol.

During the addition of the diluted polymer solution to the dispersion of the catalyst, the mixture is agitated using ultrasonic or a high shear mixer at a temperature from about 0 to 100° C., preferably from 20 to 50° C. The level of dispersion in this step is carefully controlled to avoid over-dispersion of the catalyst and formation of small or no agglomerate structure. The parameters of the attritor can be varied to control the formation of the catalyst agglomerates with the desired particle size, porosity, and pore size distribution. Preferably, the attritor has a bead to slurry ratio of from 30:70 to 70:30 by volume, more preferably 40:60 to 60:40, most preferably a ratio of 50:50. The bead size can be in a range from about 1 to 20 mm in diameter, preferably in a range of 2 to 5 mm in diameter. The beads can be made of materials such as yttria stabilized zirconia, aluminia, glass, and other ceramics. Preferably the beads are made of yttria stabilized zirconia. The attritor rotates at a speed of from about 1 to 500 rpm, preferably from about 300 to 500 rpm for a 75 cc attritor bowl.

The following Table 1 shows the effect of the bead to slurry ratio on the performance of the electrode layer comprising the catalyst agglomerates prepared according to the present invention. In these experiments, the catalyst agglomerates were prepared using an attritor of 60 cc size. The sample size was 2 g batch. The proton conductive polymer was Nafion®/IPA/$H_2O$ (1/0.5/0.5). The catalyst layer contains 90% Pt and 10% Nafion®. Three samples of the catalyst agglomerates were prepared using the following different bead to slurry ratios: Sample 21–55 (beads:slurry= 50:50 by volume), Sample 21–48 (beads:slurry=60:40 by volume), and Sample 21–56 (beads:slurry=70:30 by volume). The performance of the fuel cells comprising the catalyst agglomerates at the cathode layer was measured under the following operating conditions. All anodes were kept the same in the cathode performance tests.

Anode: $H_2$, 100 sccm, 70° C.
Cathode: Air, 200 sccm, 65° C.
Fuel cell temperature: 60° C.
Fuel stoichiometric ratio: 11.11.

TABLE 1

| Sample | Beads Vol % | Load mg/cm$^2$ | Cell Voltage at 200 mA/cm$^2$ |
|---|---|---|---|
| AD21-55 | 50 | 9.65 | 0.69 |
| AD21-48 | 60 | 8.03 | 0.59 |
| AD21-56 | 70 | 9.19 | 0.41 |

The SEM was used to analyze the morphology of the catalyst agglomerates prepared using the present attritor method. FIGS. 2–4 are the SEM photos showing the morphology of the sample catalysts AD21–55, 21–48, and 21–56.

Figure 6:
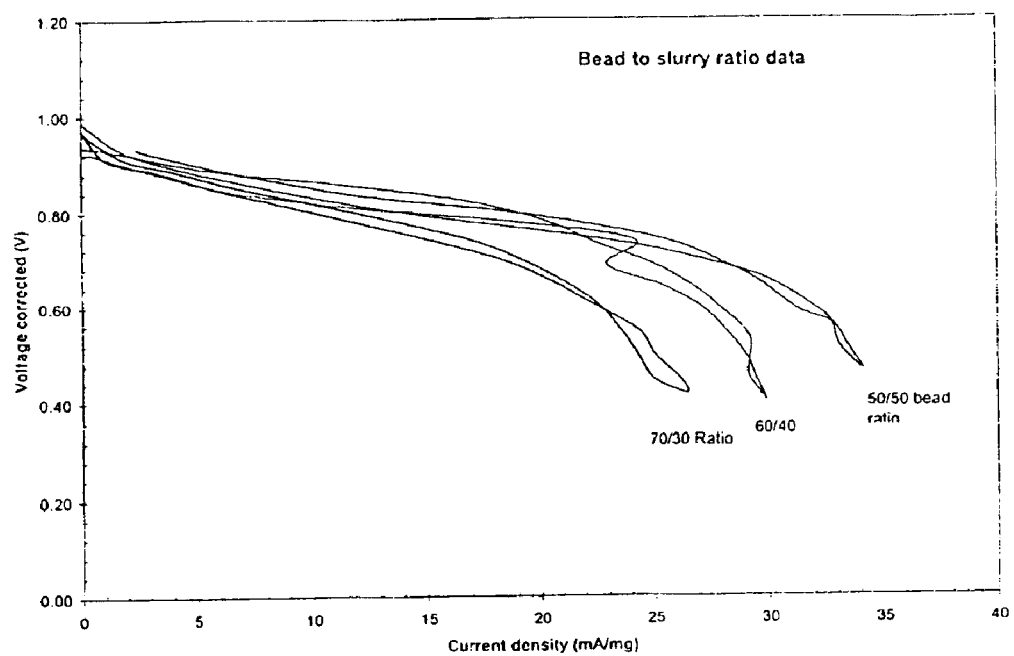
FIG. 6 is a graph showing the performance of the cathodes comprising the catalyst agglomerates prepared using an attritor having different bead to slurry ratios.

FIG. 6 is a graph showing the performance of the cathodes comprising the catalyst agglomerates prepared using an attritor having different bead to slurry ratios. The X axis is corrected for the electrode weight. The SEM photos and performance curves showed that sample AD21–55 (bead:slurry=50/50 by volume) had a better morphology and fuel cell performance at a particular stoichiometry of gas flow.

The Decane method was used to measure the porosity of the catalyst agglomerates prepared according to the present invention. The Decane method is based on the penetration of the decane non-wetting solvent in the catalyst pore structure. A pore volume is calculated by converting the amount of decane that penetrates the structure. The Decane analysis showed that the catalyst agglomerates obtained by using a bead to slurry ratio of 50/50 by volume had the highest porosity with 47.8% by volume. Correlating this result with the fuel cell performance, the catalyst agglomerates obtained by using a bead to slurry ratio of 50/50 by volume also had the best performance. The catalyst agglomerates obtained by using a bead to slurry ratio of 60/40 by volume had a porosity of 34.1% by volume, and the catalyst agglomerates obtained by using a bead to slurry ratio of 70/30 by volume had a porosity of 26% by volume.

In another embodiment of the present invention, there is provided a catalyst composition that can be directly applied onto the surfaces of the solid polymer membranes. The catalyst composition comprises the catalyst agglomerates prepared in accordance with the method described above, a solvent that plasticizes the surfaces of the catalyst agglomerates and surfaces of the solid polymer membranes, and a non-aqueous carrier solvent that does not plasticize the surfaces of the catalyst agglomerates and polymer membrane. The proton conductive polymers that are used to prepare the catalyst agglomerates can also be included in the catalyst composition. Preferably the catalyst composition is in a non-aqueous carrier solvent having some solubility of water.

Optionally, additives can be included in the catalyst composition to improve the viscosity, modify the surface tension, improve the adhesion or modify the performance characteristics of the catalyst composition. These additives can include carbon, electrochemically inert nonionic surfactants, or cross-linking agents such as polyvinylimmidazole polysiloxane or other adhesion promoters. In addition, additives such as silica particles, silinized or unsilinized, hydrophilic particles can also be included in the catalyst composition to improve the water management and methanol diffusion into the electrode.

The solvent that plasticize the surfaces of the catalyst agglomerates and polymer membrane can be non-aqueous or aqueous solvent, preferably non-aqueous. Suitable solvents that plasticize the surfaces of the catalyst agglomerates and polymer membrane include alcohol, water, and acetamides. Examples of such solvents include methoxyethanol, butoxyethanol, isopropylalcohol, and water.

The non-aqueous carrier solvents of the catalyst composition do not plasticize the surfaces of the polymer membrane. Preferably the non-aqueous carrier solvents have some solubility of water to provide a balance between the non-aqueous and aqueous character of the catalyst composition. Such non-aqueous carrier solvents include ketones, aliphatic or aromatic hydrocarbons, and acetate. Examples of such non-aqueous carrier solvents solvent include acetone, xylene, and n-butylacetate.

In a preferred embodiment, the directly applicable catalyst composition of the present invention comprises 10 to 70 percent by weight of the catalyst agglomerates prepared according to the method as described above, 1 to 20 percent be weight of a solvent to plasticize surfaces of the catalyst agglomerates and the surfaces of the polymer membranes, and 30 to 89 percent by weight of a non-aqueous carrier solvent.

The present catalyst composition has a controlled catalyst particle size to maintain a uniform coating. The catalyst composition can be applied onto the polymer membrane by using a range of techniques including sputtering, painting, electro-deposition, spraying, decal transferring, filtering and filtering transfer, tape casting, and screen printing. The coated layer can then be hot or cold pressed or calendered. Alternatively, the catalyst agglomerates can be applied onto a backing layer to be indirectly transferred to the membrane surface. The coating formed using the present catalyst composition has excellent adhesion to the polymer membranes and coating uniformity and without any clumps and swelling.

The following examples are provided to demonstrate the preparation of the catalyst agglomerates but not intended to limit the invention in any way.

EXAMPLE 1

This example demonstrates the preparation of the catalyst agglomerates for the cathode of a membrane-electrode assembly using the attritor method of the present invention.

1.9936 g of platinum black and 14.952 g of n-butyl acetate (7.5 times of the platinum black) were added to and mixed for about 10 minutes in an attritor to form a dispersion of platinum black in n-butyl acetate. The attritor contained 129 g beads of 3 mm in diameter and had a ratio of bead to slurry of 1.5 by volume. The attritor was set at 40% power. A dilute Nafion® ionomer solution was prepared by mixing 3.584 g of 5% ionomer, 1.792 g of water, and 1.792 g of isopropanol (isopropanol:water=1:1) using a sonication bath for at least 10 minutes. The dilute Nafion® ionomer solution was added to the attritor slowly through a peristaltic pump at a constant rate of 0.75 drop per second while keeping the attritor rotating. After the attritor rotated for extra 6–7 minutes, 0.0224 g of silinized fume silica was added and the attritor further rotated for 10 minutes. The resulting ink was dried in an oven at 80° C. over 10 hours to form the catalyst agglomerates.

EXAMPLE 2

This example demonstrates the preparation of the catalyst agglomerates for the anode of a membrane-electrode assembly using the attritor method of the present invention.

5.0 g of platinum-ruthenium black and 25.0 g of n-butyl acetate (5 times of the platinum-ruthenium black) were added to and mixed for about 10 minutes in an attritor to form a dispersion of platinum-ruthenium black in n-butyl acetate. The attritor contained 300 g beads of 3 mm in diameter and had a ratio of bead to slurry of 1.5 by volume. The attritor was set at 50% power. A dilute Nafion® ionomer solution was prepared by mixing 8.823 g of 5% Nafion® ionomer, 26.47 g of water (3 times of 5% ionomer) using a sonication bath for at least 10 minutes. The dilute Nafion® ionomer solution was added to the attritor slowly through a peristaltic pump at a constant rate of 0.3–0.5 drop per. second while keeping the attritor rotating. The attritor further rotated for 30 minutes. The resulting ink was dried in an oven at 80° C. over 10 hours to form the catalyst agglomerates.

EXAMPLE 3

This example demonstrates the preparation of the catalyst agglomerates for the cathode of a membrane-electrode assembly using the sonication method of the present invention.

4.0 g of platinum black and 20.0 g n-butyl acetate (5 times of the platinum black by weight) were mixed using a magnetic stirrer for about 10 minutes to obtain a uniform mixture of platinum. The mixture was sonicated in a sonication bath for about 10 minutes to obtain a dispersion of platinum. A dilute Nafion® ionomer solution was prepared by mixing 5% Nafion® solution in isopropanol (1:1). 6.72 g of the dilute Nafion® ionomer solution (75% of 10% ionomer in catalyst and ionomer ink) was added to the dispersion of platinum at a speed of 1 to 10 cc per min during stirring with a magnetic stirrer bar. The resulting ink was sonicated for about 10 minutes in a sonication bath and then taken out and stirred for about 5 to 10 minutes. The resulting ink was dried under room temperature and air environment to obtain the catalyst agglomerates.

The porosity of the catalyst agglomerates prepared according to Example 3 was 46.7% by volume as determined by the Decane method.

Test fuel cells were formed from membrane electrode assemblies prepared using 60 mW/cm$^2$ Nafion® 117 membrane catalyzed with PtRu at 8–10 mg/cm$^2$ on the anode side and Pt at 4–5 mg/cm$^2$ on the cathode side. The fuel cell performance was measure under the conditions of anode: MeOH passive, cathode: breathing, and cell temperature 20–25° C. The test fuel cell generated a current density of 200 mA/cm$^2$ at 0.3 V.

EXAMPLE 4

The same procedure was used as in Example 3 except that the amount of Nafion® ionomer used was 5.6% of the catalyst. The obtained catalyst agglomerates had porosity of 63.1–66.2% as determined by the Decane method.

EXAMPLE 5

The same procedure was used as in Example 3 except that the amount of Nafion® ionomer used was 7.8% of the catalyst. The obtained catalyst agglomerates had porosity of 49.8% by volume as determined by the Decane method.

EXAMPLE 6

This example demonstrates the preparation of the catalyst agglomerates for the anode of a membrane-electrode assembly using the sonication method of the present invention.

4.0 g of platinum ruthenium black (Pt:Ru=1:1 in atom) and 20.0 g n-butyl acetate (5 times of the platinum ruthenium black) were mixed using a magnetic stirrer for about 10 minutes to obtain a uniform mixture of platinum ruthenium. The mixture was sonicated in a sonication bath for about 10 minutes to obtain a dispersion of platinum ruthenium. A dilute Nafion® ionomer solution was prepared by mixing 5% Nafion solution in deionized water (1:1). 7.06 g of the dilute Nafion ionomer solution (15% of platinum ruthenium catalyst, 50% of the polymer needed to make up the final catalyst layer) was added to the dispersion of platinum ruthenium at a speed of 1 to 10 cc per min during stirring with a magnetic stirrer bar. The resulting ink was sonicated for about 10 minutes in a sonication bath and then taken out and stirred for about 5 to 10 minutes. The resulting ink was dried under room temperature and air environment to obtain the catalyst agglomerates.

Test fuel cells were formed from membrane electrode assemblies prepared using 62 mW/cm$^2$ Nafion® 117 membrane catalyzed with PtRu at 8–10 mg/cm$^2$ on the anode side and Pt at 4–5 mg/cm$^2$ on the cathode side. The fuel cell performance was measure under the conditions of anode: MeOH passive, cathode: breathing, and cell temperature 20–25° C. The test fuel cell generated a current density of 207 mA/cm$^2$ at 0.3 V.

The foregoing description of specific embodiments and examples of the invention have been presented for the purpose of illustration and description, they are not intended to be exhaustive or to limit the invention to the precise forms disclosed. Obviously many modifications, embodiments, and variations are possible in light of the above teaching. It is intended that the scope of the invention encompass the generic area as herein disclosed, and by the claims appended hereto and their equivalents.

What is claimed is:

1. A method of preparing catalyst agglomerates for use in a membrane electrode assembly comprising:
    dispersing particles of a catalyst in a non-aqueous solvent to form a dispersion of said catalyst;
    adding an ion conducting polymer to said dispersion of said catalyst under agitation to form catalyst agglomerates; and
    stirring said catalyst agglomerates and said dispersion of said catalyst in an attritor to control growth of said catalyst agglomerates.

2. The method of claim 1 wherein said attritor has a ratio of bead to slurry from about 30:70 to 70:30 by volume and a bead size from about 1 to 20 mm in diameter.

3. The method of claim 2 wherein said particles of said catalyst are dispersed in an attritor having a ratio of bead to slurry of about 50:50 by volume and a bead size from about 2 to 5 mm in diameter.

4. The method of claim 1 wherein said dispersion of said catalyst has a concentration of said catalyst from about 2 to 25 percent by weight.

5. The method of claim 1 wherein said ion conducting polymer is added to said dispersion of said catalyst in an amount from about 5 to 25 percent by weight of said catalyst.

6. The method of claim 5, wherein particles of platinum ruthenium are dispersed in a non-aqueous solvent to form a dispersion of platinum ruthenium, and said ion conducting polymer is added to said dispersion of platinum ruthenium in an amount from about 5 to 15 percent by weight of platinum ruthenium.

7. The method of claim 6, wherein said ion conducting polymer added to said dispersion of platinum ruthenium is diluted in an aqueous solution to a concentration from about 0.5 to 5 percent by weight of platinum ruthenium.

8. The method of claim 5, wherein particles of platinum are dispersed in a non-aqueous solvent to form a dispersion of platinum, and said ion conducting polymer is added to said dispersion of platinum in an amount from about 5 to 10 percent by weight of platinum.

9. The method of claim 8 wherein said ion conducting polymer added to said dispersion of platinum is diluted in an alcoholic solution to a concentration from about 0.5 to 5 percent by weight of platinum.

10. The method of claim 9 wherein said ion conducting polymer is diluted in an alcoholic solution with a ratio of alcohol to water from about 0.01 to 100 by weight of platinum.

11. The method of claim 10 wherein said ion conducting polymer is diluted in an alcoholic solution with a ratio of alcohol to water of about 1 by weight.

12. The method of claim 1 wherein said ion conducting polymer is added to said dispersion of said catalyst at a level from about 33 to 100 percent of said polymer needed to make up a final catalyst layer.

13. The method of claim 12 wherein said ion conducting polymer is added to said dispersion of said catalyst at a level from about 75 to 95 percent of said polymer needed to make up a final catalyst layer.

14. The method of claim 1 wherein said catalyst agglomerates and said dispersion of said catalyst are stirred in an attritor having a ratio of bead to slurry from about 30:70 to 70:30 by volume and a bead size from about 1 to 20 mm in diameter.

15. The method of claim 11 wherein said catalyst agglomerates and said dispersion of said catalyst are stirred in an attritor having a ratio of bead to slurry of about 50:50 by volume and a bead size from about 2 to 5 mm in diameter.

16. The method of claim 14 or 15 wherein said catalyst agglomerates and said dispersion of said catalyst are stirred in said attritor at a temperature from about 0 to 100° C. and at an angular velocity of rotation of said attritor from about 10 to 150 cm/s.

17. The method of claim 1 further comprising adding silinized fume silica to said dispersion of said catalyst.

18. The method of claim 1 further comprising drying said catalyst agglomerates at a temperature from about 25 to 100° C.

19. The method of claim 1 wherein said catalyst agglomerates have a porosity from about 25 to 70 percent by volume of the volume of said catalyst agglomerates.

20. A catalyst composition comprising the catalyst agglomerates prepared according to claim 1;
  a solvent to plasticize surfaces of said catalyst agglomerates and surfaces of said membranes; and
  a non-aqueous carrier solvent comprising ketones, aliphatic or aromatic hydrocarbons, and acetate.

21. The catalyst composition of claim 20 wherein said solvent to plasticize surfaces of said catalyst agglomerates and surfaces of said membranes comprises alcohol, water, and acetamides.

22. The catalyst composition of claim 21 wherein said solvent to plasticize surfaces of said catalyst agglomerates and surfaces of said membranes comprises methoxyethanol, butoxyethanol, isopropylalcohol, and water.

23. The catalyst composition of claim 20 wherein said non-aqueous carrier solvent comprises acetone, xylene, and n-butylacetate.

24. The catalyst composition of claim 20 further comprising additives to modify performance characteristics of said catalyst composition.

25. The catalyst composition of claim 24 wherein said additives comprise carbon, electrochemically inert nonionic surfactants, or cross-linking agents.

26. The catalyst composition of claim 20 further comprising an ionomer.

27. The catalyst composition of claim 20 wherein said composition comprises 10–70 percent by weight of said catalyst agglomerates, 1–20 percent by weight of said solvent to plasticize surfaces of said catalyst agglomerates and surfaces of said membrane, and 30–89 percent by weight of said non-aqueous carrier solvent.

\* \* \* \* \*